UNITED STATES PATENT OFFICE.

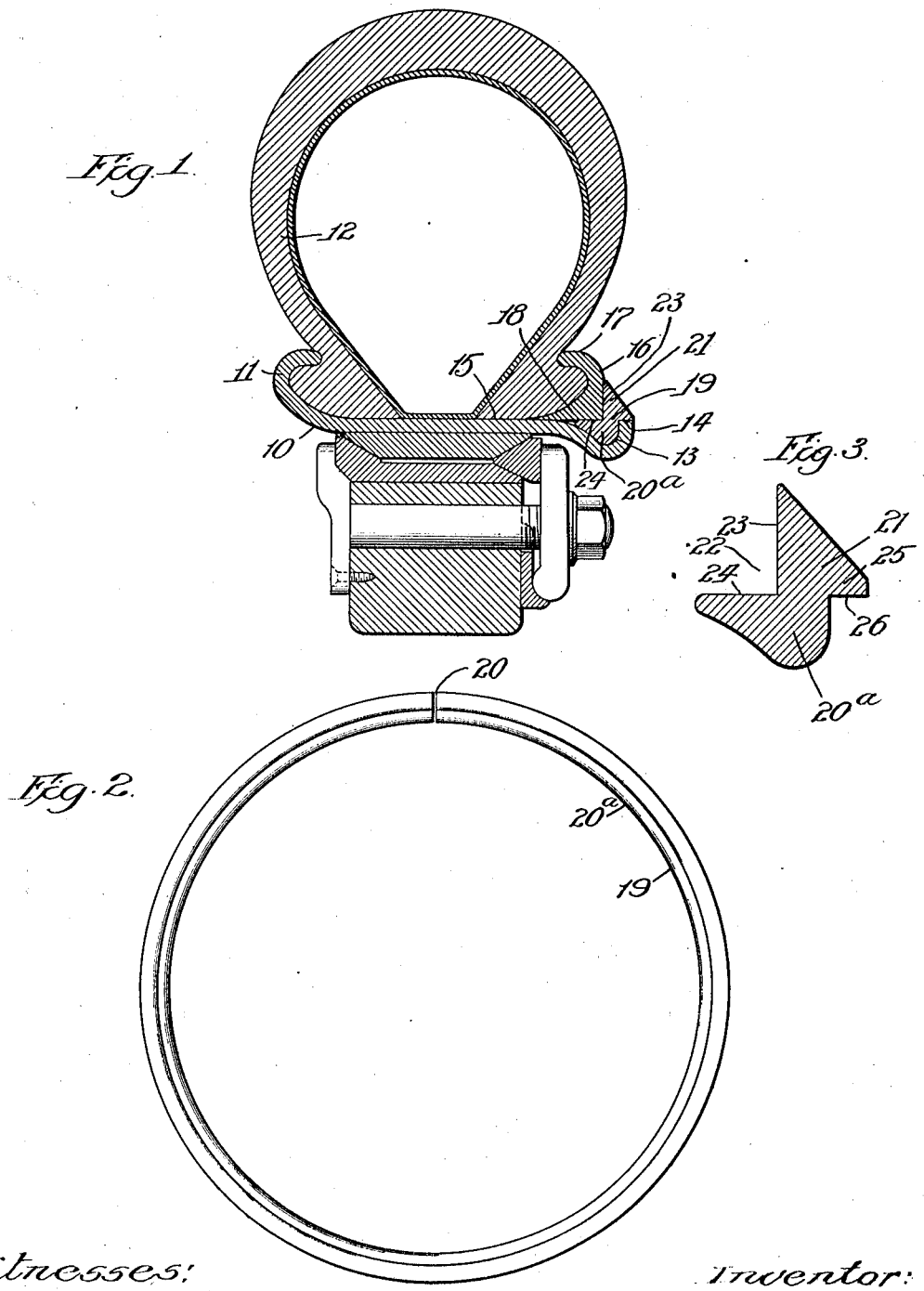

PERCY B. BOSWORTH, OF AKRON, OHIO, ASSIGNOR TO THE FIRESTONE TIRE & RUBBER COMPANY, OF AKRON, OHIO, A CORPORATION OF OHIO.

VEHICLE WHEEL-RIM.

1,031,236.   Specification of Letters Patent.   Patented July 2, 1912.

Original application filed December 24, 1909, Serial No. 534,873. Divided and this application filed June 4, 1910. Serial No. 565,084.

*To all whom it may concern:*

Be it known that I, PERCY B. BOSWORTH, a citizen of the United States, and a resident of Akron, in the county of Summit and State of Ohio, have invented certain new and useful Improvements in Vehicle Wheel-Rims, of which the following is a specification.

My invention pertains to improvements in the features of vehicle wheel rims which permit the quick and ready detachment of pneumatic or other tires. Its leading aim and object is the production of a construction in which the locking-ring for holding the removable tire-flange in operative position and the coöperating parts of the rim proper shall be such as to secure a maximum of strength and security with a minimum amount of metal. I have found that to reach this result, to hold the flange most securely in place, to reduce to the lowest limit the tendency of the locking-ring to leave its groove in the rim, and to obtain the best bracing effect by the ring on the flange, a specially formed ring incorporating the features of novelty and improvement of this invention is necessary, or at least highly desirable.

In order that a full and complete understanding of this invention may be had by those skilled in this art, I have illustrated an embodiment of the invention in the accompanying drawing, and in such drawing, Figure 1 is a section through the rim portion of a vehicle wheel showing one form of my improved means permitting quick detachment of the resilient tire; Fig. 2 is a face view of the split locking-ring employed in the construction shown in Fig. 1 for maintaining the detachable rim flange in position on the wheel, and Fig. 3 is an enlarged cross section through the locking-ring.

Referring to these drawings it will be noticed that the metallic tire rim 10 of the usual circular form is provided at one edge with an inturned hook-shaped portion 11, constituting a member adapted to effectively engage one of the beads of a pneumatic tire 12. Extending around such rim 10 at its opposite edge is a depressed groove 13, formed by properly deflecting or bending the metal of the rim, as is clearly indicated in Fig. 1 of the drawing, the intermediate portion or inner side of the groove being gradually inclined inwardly as distinguished from an abrupt or right angle bend. The surface of this tire rim at the point 14 disposed laterally outwardly of the groove 13 is of cylindrical form and is of the same diameter and substantially flush or in register with the outer cylindrical surface 15 of that portion of the rim 10 bordering or adjacent to the inner edge of the groove 13. The vehicle wheel is also supplied with an inextensible tire flange 16 having an inturned part 17 adapted and intended to engage and coöperate with the opposite bead of the tire 12, the inner surface 18 of such flange being cylindrical and of substantially the same diameter as the surfaces 14 and 15, whereby this removable flange may be readily placed on the rim by sliding over the groove 13, as will be readily understood. In order to prevent unintentional removal or displacement of this tire flange 16, I provide the structure with a split locking-ring 19 divided at the point 20, which permits circumferential contraction and expansion, such ring being formed complementary to and adapted to be sprung into and seated in the groove 13, as I have clearly illustrated in Fig. 1. This ring 19 is composed of two integral parts, an inner portion 20ª shaped on its inner surface to conform substantially to the contour of groove 13, the outer portion 21 of such split locking-ring being shaped in cross section substantially like a right-angle triangle, such triangular portion of the ring being off-set laterally with respect to the inner part 20, as is shown, whereby to provide on one side of the ring an annular recess 22 having an upstanding plane wall 23 and an inner cylindrical surface 24 substantially flush and in register with the adjacent surface 15 of the rim, this construction being provided for the purpose of accommodating a part of the tire flange 16 in the recess 22, as I have indicated in the drawing, the object of such overlapping flange and ring being to enable the former to prevent accidental expansion of the latter due to any cause, such as centrifugal force, sufficient to permit the locking-ring to leave the groove. In other words, the flange when in position overlapping the ring acts to lock the latter in its receiving groove 13. The outer or triangular part of the locking-ring acts as an efficient brace, bearing against the flange and maintaining the latter in operative relation with the tire with which it coöperates. The construction of this ring is such that it has an overhanging shoulder 25 with an under or inner cylindrical surface 26 of practically the same diameter as the surface 14 over which it projects and on which it bears in performing its function of bracing the flange against displacement.

To those skilled in this art it will be apparent that by having the surface 14 extended radially as far as permissible and permit the ready placing of the flange 16 on the rim, a trough or groove 13 is provided of sufficient depth to eliminate the possibility of the unintentional removal of the locking-ring therefrom. The provision of the two cylindrical coöperating surfaces 14 and 26 supplies an efficient and effective abutment or support for the triangular flange-bracing portion of the ring, and in a construction of this kind the tendency of the flange and ring to leave the rim is satisfactorily prevented. Also by providing the recess on the inner surface of the ring, and having the tire flange fit in the same, a suitable lock is supplied, preventing the possibility of the ring expanding sufficiently to fly out of the groove. In other words, in this improved construction I have supplied a form and style of locking-ring which effectively performs the functions desired, and employs at the same time a minimum amount of metal.

It has heretofore been proposed to have the tire flange overlap the locking-ring for the purpose of holding the latter in engagement with the rim, and it has also been proposed to have a locking-ring project outwardly beyond the groove and overlap that part of the rim disposed outwardly of such groove, but in no instance, as far as I am advised, have the various features of novelty and improvement of the present device been incorporated in a construction of this character in which the various surfaces are disposed and the various parts proportioned and chosen to secure a maximum locking and bracing function with the employment of a minimum amount of metal.

By recessing the locking-ring for the accommodation and reception of the rim flange, this locking-ring and that part of the rim grooved for its reception may be disposed inwardly of the wheel farther than is possible where no such overlapping of the parts is secured, and in those instances where the locking-ring does not overlap the part of the rim outwardly of the groove, then the rim proper has to be made wider whereby to permit the accommodation of a locking-ring of sufficient body to safely perform its locking function. It will be apparent, therefore, that by combining the various overlapping features specified, the parts of the structure may be so condensed or contracted and reduced in size as to necessitate the employment of a relatively small amount of metal, at the same time securing the desired locking and bracing effect.

To those skilled in the art it will be apparent that to remove the locking-ring it is merely necessary to deflate the tire and push the flange rim inwardly so that it no longer overlaps the locking-ring, which disposition of the parts permits ready expansion of the ring and its removal from the rim. Then the rim flange may be slid off of the rim in the usual manner. To assemble the parts the reverse operation is carried out; that is, the rim flange is pushed on to the rim over the groove sufficiently to permit the introduction and contraction of the locking-ring in the groove, and then the rim flange is moved outwardly to overlap the ring, being held in such locking engagement as long as the tire is inflated.

I do not claim to be the original inventor of the idea of employing a removable rim flange in conjunction with a locking-ring accommodated in a groove or trough in the tire rim, but I do, however, claim to be the originator of the style and form of parts described above, which improved construction has marked features of advantage and utility in this art.

In the drawings, forming a part of this application, I have shown no means for preventing creeping of the locking ring around the rim, nor have I indicated any means between the removable flange and locking ring other than the overlapping feature to prevent expansion of the ring under the action of centrifugal force. Any suitable means may be provided for this purpose, if desirable or necessary, as will be readily understood.

This application is a division of my former application, Serial No. 534,873, filed December 24, 1909.

I claim:

1. In a tire-retaining means, the combination of a tire rim having a depressed groove at one edge thereof bounded at its outer side by an upstanding rib, a tire-retaining flange adapted to rest at its inner portion upon the bottom wall of the rim, and a locking-ring adapted to fit in said groove, underlie the tire flange, and overlie said rib, the contacting surfaces of the rim, flange, locking-ring, and rib being in alinement or register, substantially as described.

2. In a vehicle wheel, the combination of a tire rim having a groove at one edge, that portion of the rim at the outer side of said groove having an external cylindrical surface of substantially the same diameter and in register with the adjacent external surface of the rim bordering the opposite side of said groove, a removable tire flange adapted to slide over said groove on to the rim in position to engage the tire, and a locking-ring adapted to be seated in said groove by circumferential contraction and to project outwardly beyond said groove to act as an abutment for the retention of the said tire flange in place, said ring being cut away on its inner side to provide an annular recess for the accommodation of said tire flange, the inner face of said recess being of cylindrical form and substantially flush with the adjacent surface of the tire rim, said locking-ring being also provided with an over-hanging bracing shoulder with a cylindrical inner face adapted to overlie and bear against that part of the rim at the outer side of said groove, substantially as described.

3. In a vehicle wheel, the combination of a tire rim having a groove at one edge, that portion of the rim at the outer side of said groove having an external cylindrical surface of substantially the same diameter and in register with the adjacent external surface of the rim bordering the opposite side of said groove, a removable tire flange adapted to slide over said groove on to the rim in position to engage the tire, and a locking-ring adapted to be seated in said groove by circumferential contraction and to project outwardly beyond said groove to act as an abutment for the retention of the said tire flange in place, said ring being cut away on its inner side to provide an annular recess for the accommodation of said tire flange, the inner face of said recess being of cylindrical form and substantially flush with the adjacent surface of the tire rim, said locking-ring being also provided with an over-hanging bracing shoulder with a cylindrical inner face adapted to overlie and bear against that part of the rim at the outer side of said groove, said ring being beveled from the top edge of said recess to the outer edge of said shoulder, substantially as described.

4. A contractible locking-ring having an inner portion shaped in cross-section to conform substantially to the groove in which it is adapted to be received, said ring having an outer part integral with said inner portion and of substantially right angle triangle form in cross-section, such triangular portion being offset laterally with respect to said inner portion, providing on one side of the ring an annular recess and on the other side an annular bracing over-hanging shoulder, the inner face of such recess and the inner surface of said shoulder being each of substantially cylindrical shape and in alinement or register one with another, substantially as described.

5. In combination with a tire rim having a relatively fixed tire engaging flange at one of its marginal edges and a depressed groove at its opposite edge provided with an upstanding rib, a removable tire retaining flange having a flat base portion overlying the tire rim and projecting outwardly to overhang the groove in alinement or register with the rim, and a locking ring for said flange having a portion seated in said groove and engaging and underlying the projecting base portion of the retaining flange, and a projecting portion engaging the outer surface of the tire retaining flange and overlying the upstanding rib, substantially as described.

6. The combination with a tire rim having a relatively fixed tire engaging flange at one of its marginal edges and a depressed groove affording a seat for a locking ring at its opposite edge, the marginal portion of the rim outside the groove being upturned to provide a vertically upstanding rib, a removable tire retaining flange having a flat base portion overlying and resting upon the tire rim and projecting outwardly above the groove in alinement or register with the rim, a locking ring for said flange having a portion seated in the groove, the upper surface of which underlies and engages the projecting base portion of the retaining flange in alinement or register with the rim, and a portion projecting beyond the groove engaging the outer surface of the tire retaining flange and overlying and resting upon the edge of the upstanding rib in alinement or register with the tire rim.

PERCY B. BOSWORTH.

Witnesses:
  HENRY M. HUXLEY,
  WALTER M. FULLER.